United States Patent
Suzuki

(10) Patent No.: US 8,096,662 B2
(45) Date of Patent: Jan. 17, 2012

(54) LIGHT SOURCE UNIT HAVING REFLECTIVE WALL SURFACES AND LIGHT-EMITTING ELEMENTS, AND PROJECTOR UTILIZING THE LIGHT SOURCE UNIT

(75) Inventor: Yukio Suzuki, Hamura (JP); Yumi Suzuki, legal representative, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 1017 days.

(21) Appl. No.: 11/810,993

(22) Filed: Jun. 7, 2007

(65) Prior Publication Data

US 2007/0285928 A1   Dec. 13, 2007

(30) Foreign Application Priority Data

Jun. 8, 2006  (JP) .................................. 2006-160299

(51) Int. Cl.
    *G03B 21/28*   (2006.01)
(52) U.S. Cl. ........... 353/81; 359/618; 362/615; 385/133
(58) Field of Classification Search .................. 353/99, 353/81; 359/618; 362/615, 317; 385/36, 385/133
    See application file for complete search history.

(56) References Cited

U.S. PATENT DOCUMENTS

| | | | |
|---|---|---|---|
| 6,545,814 B2 * | 4/2003 | Bartlett et al. | 359/636 |
| 7,185,985 B2 | 3/2007 | Hanano | |
| 7,252,393 B1 * | 8/2007 | Ma et al. | 353/94 |
| 7,350,924 B2 | 4/2008 | Hanano | |
| 2004/0062044 A1 * | 4/2004 | Hanano | 362/317 |
| 2004/0252281 A1 * | 12/2004 | Fischer et al. | 353/53 |
| 2005/0018149 A1 * | 1/2005 | Takeda et al. | 353/99 |
| 2005/0219468 A1 * | 10/2005 | Yoshii et al. | 353/31 |
| 2006/0221310 A1 * | 10/2006 | Kim et al. | 353/99 |
| 2006/0290899 A1 * | 12/2006 | Davis et al. | 353/81 |
| 2007/0195278 A1 * | 8/2007 | Yokote et al. | 353/34 |
| 2009/0128781 A1 * | 5/2009 | Li | 353/20 |

FOREIGN PATENT DOCUMENTS

| | | |
|---|---|---|
| JP | 10-269802 A | 10/1998 |
| JP | 2003-262795 A | 9/2003 |
| JP | 2004-102132 A | 4/2004 |
| JP | 2006-114451 A | 4/2006 |

OTHER PUBLICATIONS

Japanese Office Action dated May 29, 2008 and English translation thereof issued in counterpart Japanese Appln. No. 2006-160299.

* cited by examiner

*Primary Examiner* — Georgia Y Epps
*Assistant Examiner* — Kevin Wyatt
(74) *Attorney, Agent, or Firm* — Holtz, Holtz, Goodman & Chick, PC

(57) ABSTRACT

A light source unit has a main body portion and light emitting elements, and the main body portion includes wall surfaces which constitute reflecting planes which are inclined so as to define a rectangular projecting port, and an inclination of the wall surfaces lying on longer member sides constitutes an inclined angle which is smaller than an inclination of the wall surfaces lying shorter member sides of the projecting port, the wall surfaces on the shorter member sides being each formed into a trapezoidal shape.

18 Claims, 11 Drawing Sheets

LIGHT SOURCE UNIT HAVING REFLECTIVE WALL SURFACES AND LIGHT-EMITTING ELEMENTS, AND PROJECTOR UTILIZING THE LIGHT SOURCE UNIT

BACKGROUND OF THE INVENTION

1. Field of the Invention

The present invention relates to a light source unit utilizing a light emitting element and a projector utilizing the light source unit.

2. Description of the Related Art

Currently, in many cases, an extra-high pressure mercury lamp or metal halide lamp having a high luminance is used as a light source of a data projector, however, since these light emitting elements have a large heat value, there has been caused a problem that a cooling mechanism becomes complex in configuration and is enlarged in size. Because of this, there have been proposed light sources for small projectors utilizing light-emitting diodes and the like in which heat values are relatively small. For example, the Japanese Unexamined Patent Publication No. 2003-262795 proposes a projector which utilizes a light source in which light emitting elements such as light emitting diodes are arranged into an array.

In the light source unit in which light emitting diodes are used as light emitting elements and a large number of light emitting elements are arranged in the aforesaid manner, light emitting elements are mounted on a substrate to form a light source substrate, and the light source substrate so formed is disposed on a bottom surface of a mirror tunnel formed into a quadrangular prism whose internal surfaces are made into reflecting planes, whereby light reflected on the internal surfaces of the mirror tunnel is configured to be projected in an optical axis direction, and the light so projected is shone on to a display element such as a DMD (Digital Micromirror Device) via a group of lenses and a mirror which constitute a light source side optical system.

In addition, pluralities of red light emitting diodes, green light emitting diodes and blue light emitting diodes are arranged on the light source substrate, and a red light beam, green light beam and blue light beam are projected from the light source unit so as to be shone on to the display element.

In the aforesaid light source unit in which the light emitting diodes are arranged on the bottom surface of the mirror tunnel, in the event that a large number of light emitting diodes are attempted to be arranged thereon, the mirror tunnel has to be thicker, which will disrupt the miniaturization of the projector which utilizes the relevant light source unit.

In addition, when the light emitting diodes are illuminated, the light emitting diodes are badly affected by heat generated by the light emitting diodes disposed adjacent thereto, and to eliminate the bad influence from the adjacent light emitting diodes, the light emitting diodes need to be arranged at predetermined intervals, and when light emitting diodes are attempted to be so disposed on a certain fixed area on the bottom surface of the mirror tunnel, the number of light emitting diodes to be disposed is limited.

Then, in the event that the diameter of the mirror tunnel is increased to accommodate more light emitting diodes in order to increase the quantity of light projected from the light source unit, with the quadrangular prism-shaped mirror tunnel, among light beams which are reflected on internal wall surfaces of the mirror tunnel and are then projected out from the mirror tunnel, the quantity of a light beam which intersects the optical axis of the mirror tunnel at a large angle is increased.

Consequently, the light projected from the light source unit is diffused, and unless a countermeasure is taken in which the number of lens elements in the light source side lens group is increased, or the like, the utilization factor of light is reduced, leading to a problem that an increase in the number of light emitting diodes does not contribute directly to constitute a contribution to an increase in illuminance of the display element.

The invention was made in view of these situations, and an aspect thereof is to provide a small light source which can facilitate the arrangement of a large number of light emitting elements and can shine light projected from the light source unit on to the display element with good efficiency.

SUMMARY OF THE INVENTION

According to a preferred aspect of the invention, there is provided a light source unit having a main body portion and light emitting elements, wherein the main body portion includes wall surfaces which constitute reflecting planes and which are inclined so as to define a rectangular projecting port, wherein an inclination angle of the wall surfaces provided on longer member sides of the projecting port is smaller than an inclination angle of the wall surfaces disposed on shorter member sides of the projecting port, wherein the wall surfaces disposed on the shorter member sides each have a trapezoidal shape, and wherein the light emitting elements are disposed at respective wall surfaces on the longer member sides and the shorter member sides at substantially a same distance from the projecting port.

In addition, according to another preferred aspect of the invention, there is provided a projector including a light source unit, a light source side optical system, a display element for generating an image to be projected, and a projection side optical system for projecting the image to be projected, wherein the light source unit has a main body portion and light emitting elements, wherein the main body portion includes wall surfaces which constitute reflecting planes and which are inclined so as to define a rectangular projecting port, wherein an inclination angle of the wall surfaces disposed on longer member sides of the projecting port which is smaller than an inclination angle of the wall surfaces disposed on shorter member sides of the projecting port, wherein the wall surfaces disposed on the shorter member sides each have a trapezoidal shape, and wherein the light emitting elements are disposed at respective wall surfaces on the longer member sides and the shorter member sides at substantially a same distance from the projecting port.

DETAILED DESCRIPTION OF THE PREFERRED EMBODIMENTS

Figure 1:
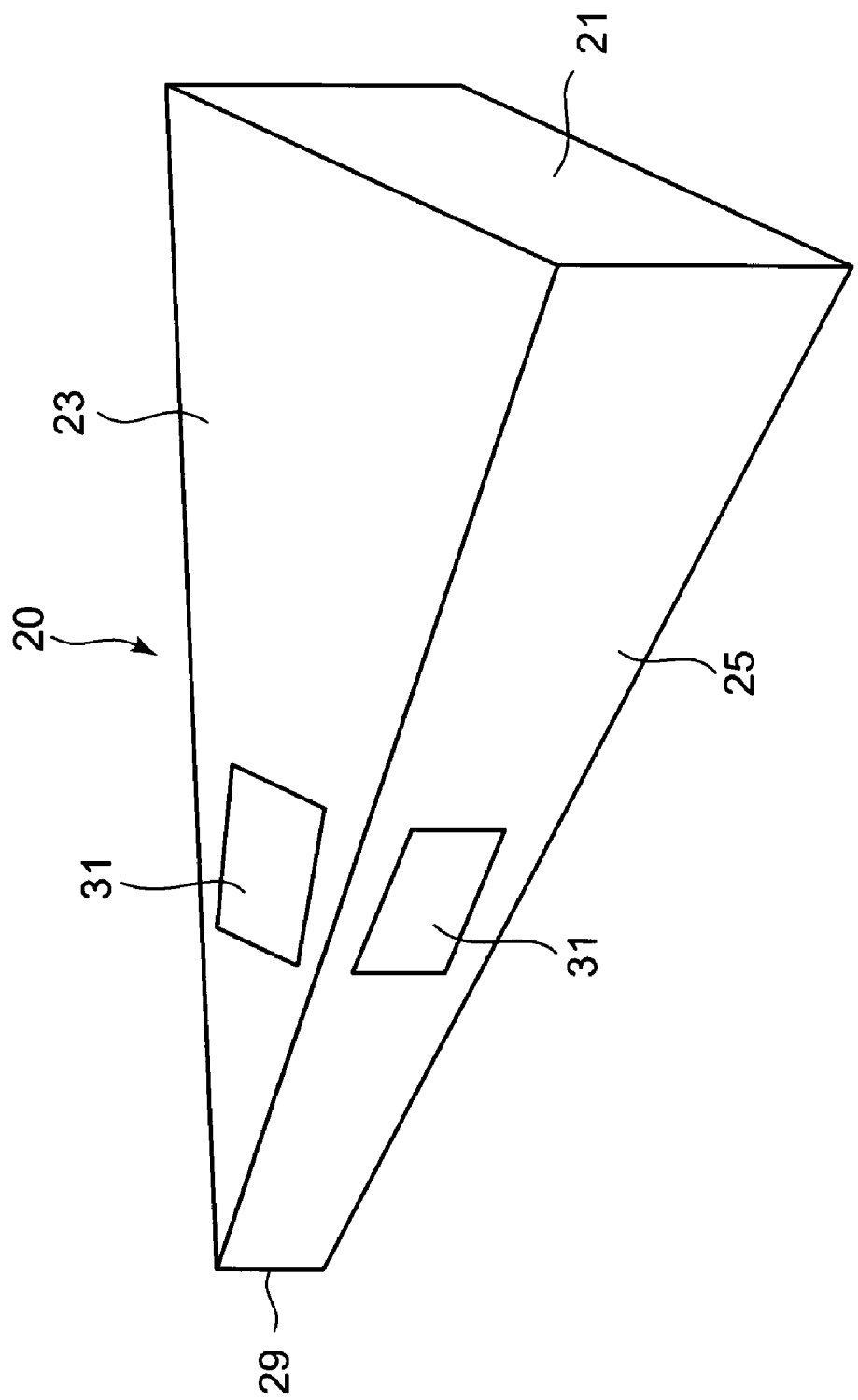
FIG. 1 is a perspective view showing a shape of a light source unit according to the invention.

A best mode for carrying out the invention is represented by a projector 100 which includes a light source unit 40, light source unit side lens elements 147, 148 and a mirror 151 which constitute a light source side optical system, a display element 155 which receives light from the mirror 151 to generate an image to be projected, a projection side optical system for projecting the image to be projected which is formed at the display element 155, a projector control unit and the like.

In addition, the light source unit 40 of the projector 100 has a main body portion 20 and light emitting elements 11, and the main body portion 20 includes side walls which constitute inclined reflecting planes which define a rectangular projecting port 21. The inclination of wall surfaces 23, 24 which lie on longer member sides of the projecting port 21 is made to constitute an inclined angle which is smaller than the inclination of side walls 25, 26 which lie on shorter member sides of the projecting port 21, and the shorter member side wall surfaces 25, 26 are each formed into a trapezoidal shape.

In the main body portion 20 of the light source unit 40, a rectangular rear end face 27 is formed at a rear end of the main body portion 20 in such a manner as to be smaller than the projecting port 21, and the rear end face 27 is made parallel to the projecting port 21. The rear end face 27 has a shape in which longer member sides thereof coincide with the shorter member sides of the projecting port 21. Then, the main body portion 20 is a solid tapering rod in which a mirror coating is applied to wall surfaces thereof, and light emitting elements 11 which are mounted on the main body portion 20 are made up of red light emitting diodes, green light emitting diodes and blue light emitting diodes.

Furthermore, these red light emitting diodes, green light emitting diodes and blue light emitting diodes are disposed in rows and columns on a substrate 13 in such a manner that the same color light emitting diodes are not disposed adjacent to each other in a direction which is parallel to the projecting port 21 and a direction which intersects the projecting port 21, and the light emitting substrate 13 on which the light emitting elements 11 are mounted is provided on the longer member side wall surfaces 23, 24 and the shorter member side wall surfaces 25, 26 in positions which lie in the vicinity of the rear end face 27.

Hereinafter, embodiments of the invention will be described in greater detail.

A first embodiment of a light source unit 40 according to the invention is such that a plurality of light emitting elements are mounted on a main body made of an optical glass, and this main body is, as shown in FIG. 1, made up of two planes which are each formed into an isosceles triangle and two planes which are each formed into an isogonal trapezoid. The triangular planes are made to constitute upper and lower surfaces, while the trapezoidal planes are made to constitute right and left side surfaces, and a rectangular plane is formed at one end of the main body, so that the main body is formed into a pentahedron.

Figure 2:
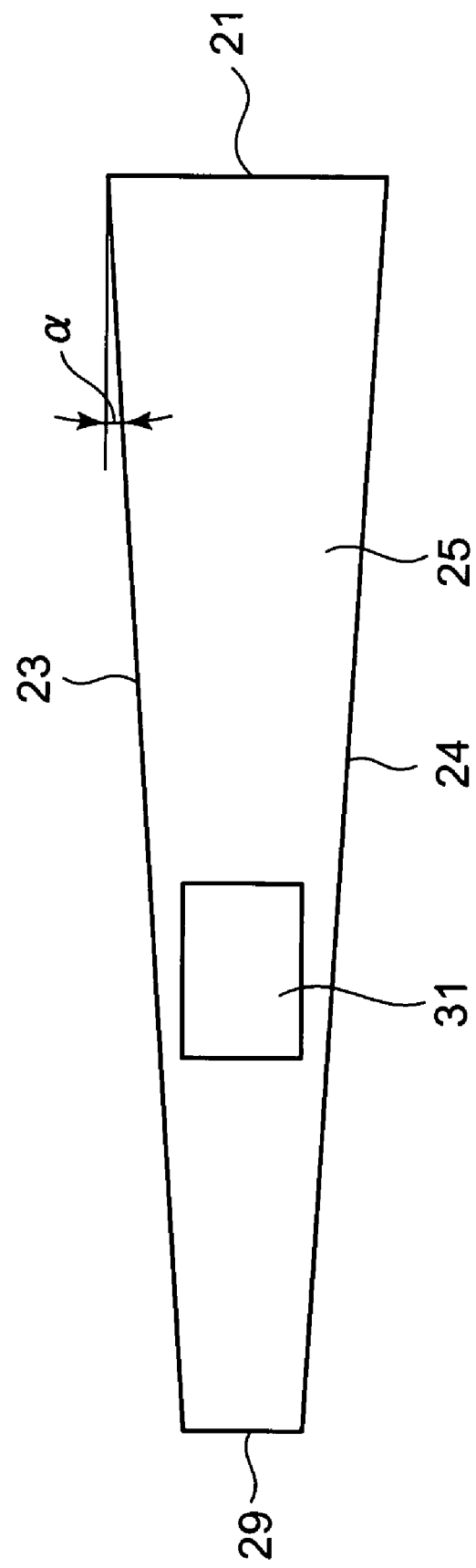
FIG. 2 is a side view showing a shape of the light source unit according to the invention.
Figure 3:
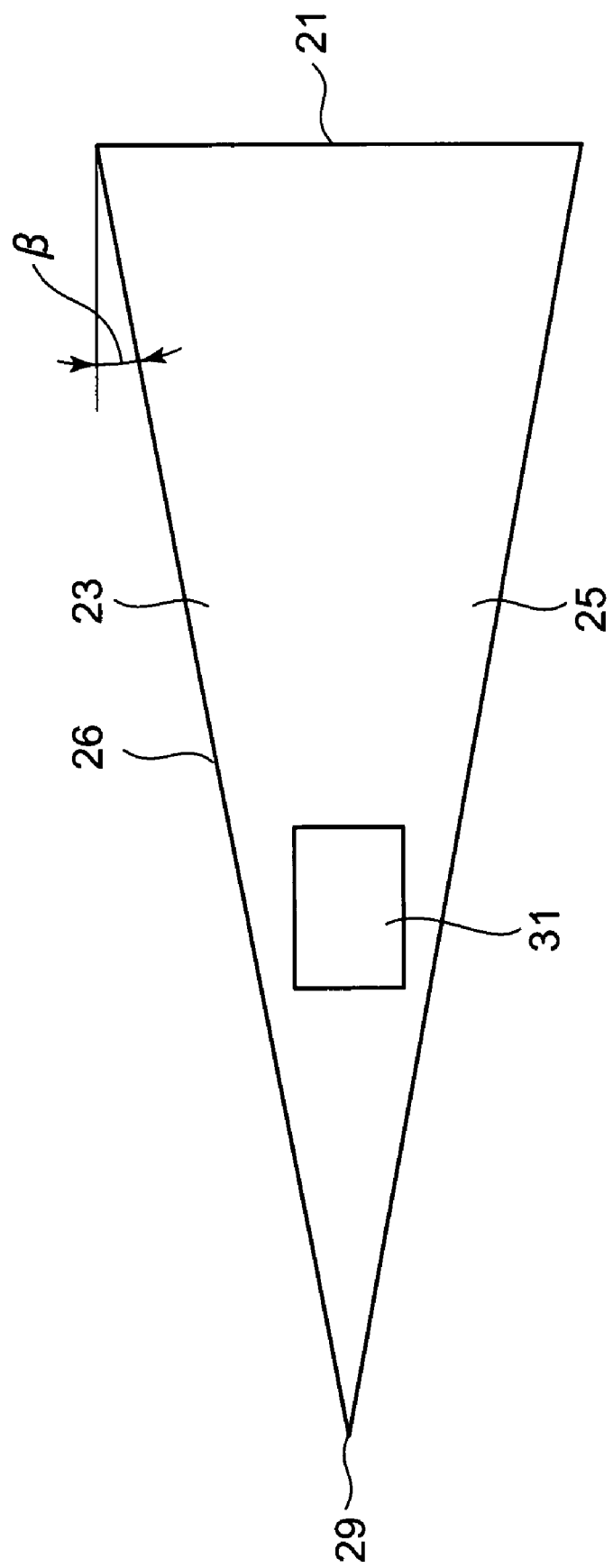
FIG. 3 is a top view of a shape of the light source unit according to the invention.

The main body portion 20, which is the main body made of an optical glass, is such that an inclination $\alpha$, which is shown in FIG. 2, of a side member of the trapezoid which constitutes the right side wall 25, that is, an inclination $\alpha$ of the top wall 23 and the bottom wall 24 relative to the perpendicular of the projecting port 21 is made smaller than an inclination $\beta$, which is shown in FIG. 3, of sides of the triangle forming the top wall 23 of the main body portion 20 whose lengths are equal and that the length of bottom members of the trapezoids which form the right side wall 25 and the left side wall 26 which has the same shape as that of the right side wall 25 is made shorter than, or specifically speaking, about three quarters of a bottom member of the triangle.

In addition, surfaces of the planar top wall 23 and the bottom wall 24 whose shape is the same as that of the top wall 23, and furthermore, surfaces of the right side wall 25 and the left side wall 26 whose shape is the same as that of the right side wall 25 are made to constitute reflecting planes, respectively, and the rectangular end face is made to constitute a light projecting port 21. A light source mounting portion 31 is provided on each of the four wall surfaces which are made to constitute the reflecting planes, so that light emitted by the light emitting elements 11 is configured to be taken into the interior of the main body portion 20 from these light source mounting portions 31.

Figure 4:
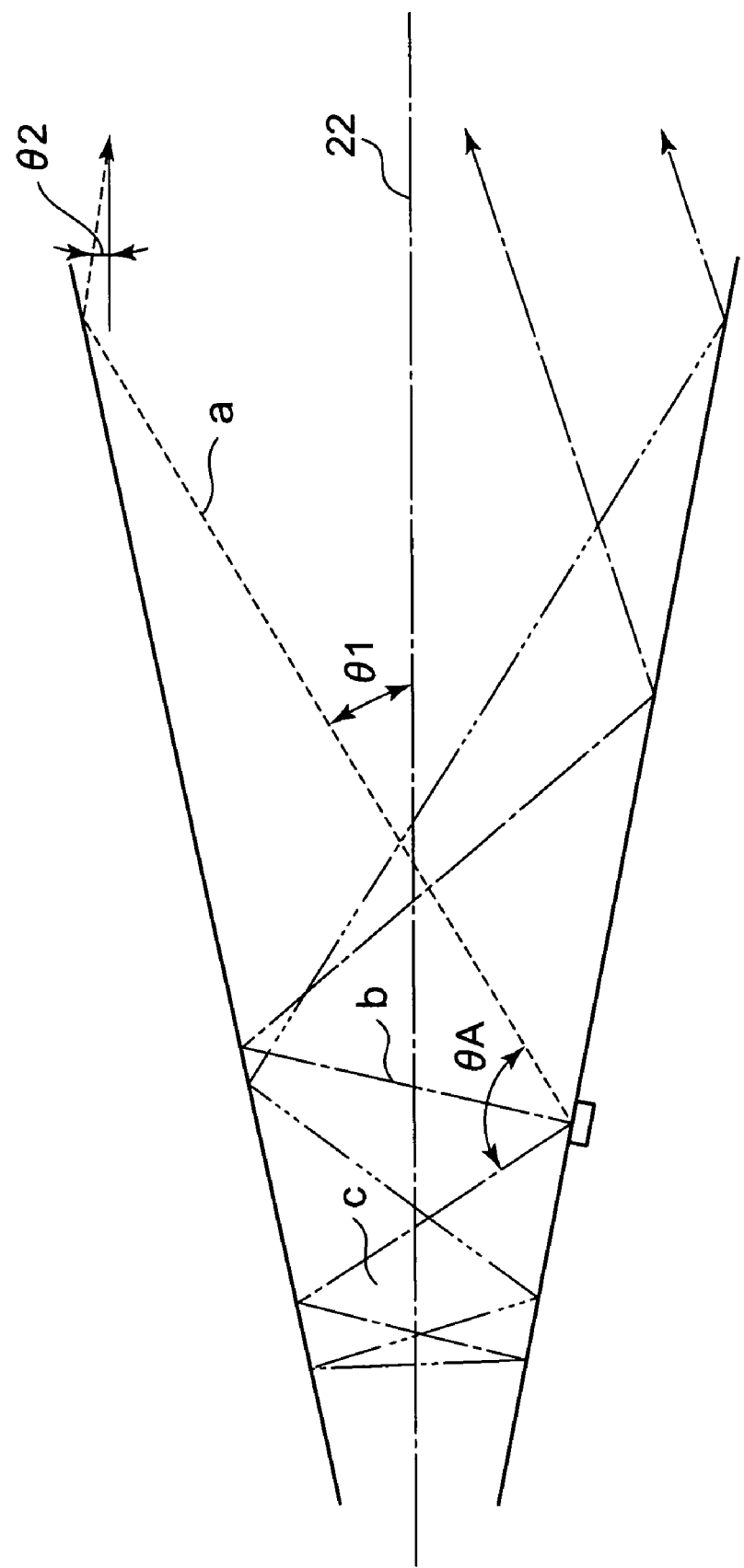
FIG. 4 is a sectional view showing exemplarily a light reflecting state of the light source unit according to the invention.

Consequently, light emitted from the light emitting elements 11 such as light emitting diodes provided on the light source mounting portions 31 is reflected as is shown in FIG. 4. For example, a light ray c which travels from the light emitting element 11 to the rear of the main body portion 20 is reflected repeatedly between an opposite plane to the light emitting element mounting plane on which the light emitting elements 11 are mounted and the relevant light emitting element mounting plane and is eventually directed towards the projecting port 21 so as to be projected therefrom, and a light ray b which is projected from the light emitting element 11 to a forward direction thereof is reflected on the opposite plane and the light emitting element mounting plane so as to be eventually projected from the projecting port 21 with an angle at which the light ray b intersects an optical axis 22 made smaller than when the light ray was projected from the light emitting element 11.

In addition, a light ray a which is projected from the light emitting element 11 and is reflected on the wall surface which is the opposite plane to the light emitting element mounting plane on which the light emitting element 11 is mounted at a portion in the vicinity of the projecting port 21 is also projected from the projecting port 21 with an intersection angle $\theta 2$ at which the light ray intersects the optical axis 22 after reflected made smaller than an intersection angle $\theta 1$ at which the light ray intersects the optical axis 22 before reflected.

In this way, the light ray which is projected from the light emitting element 11 towards the projecting port 21 and the light ray which is projected from the light emitting element 11 towards a rear end portion 29 side of the main body portion 20 are both projected out from the projecting port 21, while the angles of the light rays traveling towards the projecting port 21 at which they intersect the optical axis 22 are made smaller each time they are reflected on the wall surfaces, whereby light which was projected at a wide angle θA from the light emitting element 11 can be projected from the projecting port 21.

Consequently, light rays from the light emitting elements 11 mounted on the top wall 23 and the bottom wall 24 and traveling towards the projecting port 21 while intersecting the optical axis 22 are projected from the projecting port 21 in such a manner that the angles at which the light rays intersect the optical axis 22 are reduced by 2α each time they are reflected once on the top wall 23 or the bottom wall 24, thereby making it possible to reduce the diffusion angle of the light projected from the projecting port 21.

In addition, light rays from the light emitting elements 11 mounted on the right side wall 25 and the left side wall 26 are also projected from the projecting port 21 in such a manner that the angles at which they intersect the optical axis 22 are reduced by 2β each time they are reflected once on the left side wall 26 or the right side wall 25, thereby making it possible to reduce the diffusion angle of the light projected from the projecting port 21.

Then, when light emitting diodes are mounted on the main body portion 20 as the light emitting elements 11, a plurality of light emitting diodes are mounted on the light source substrate 13 which is made up of a flat plate-like substrate, and the light source substrate 13 on which the plurality of light emitting diodes are so mounted is then fixed to each wall surface of the main body portion 20.

Figure 5:
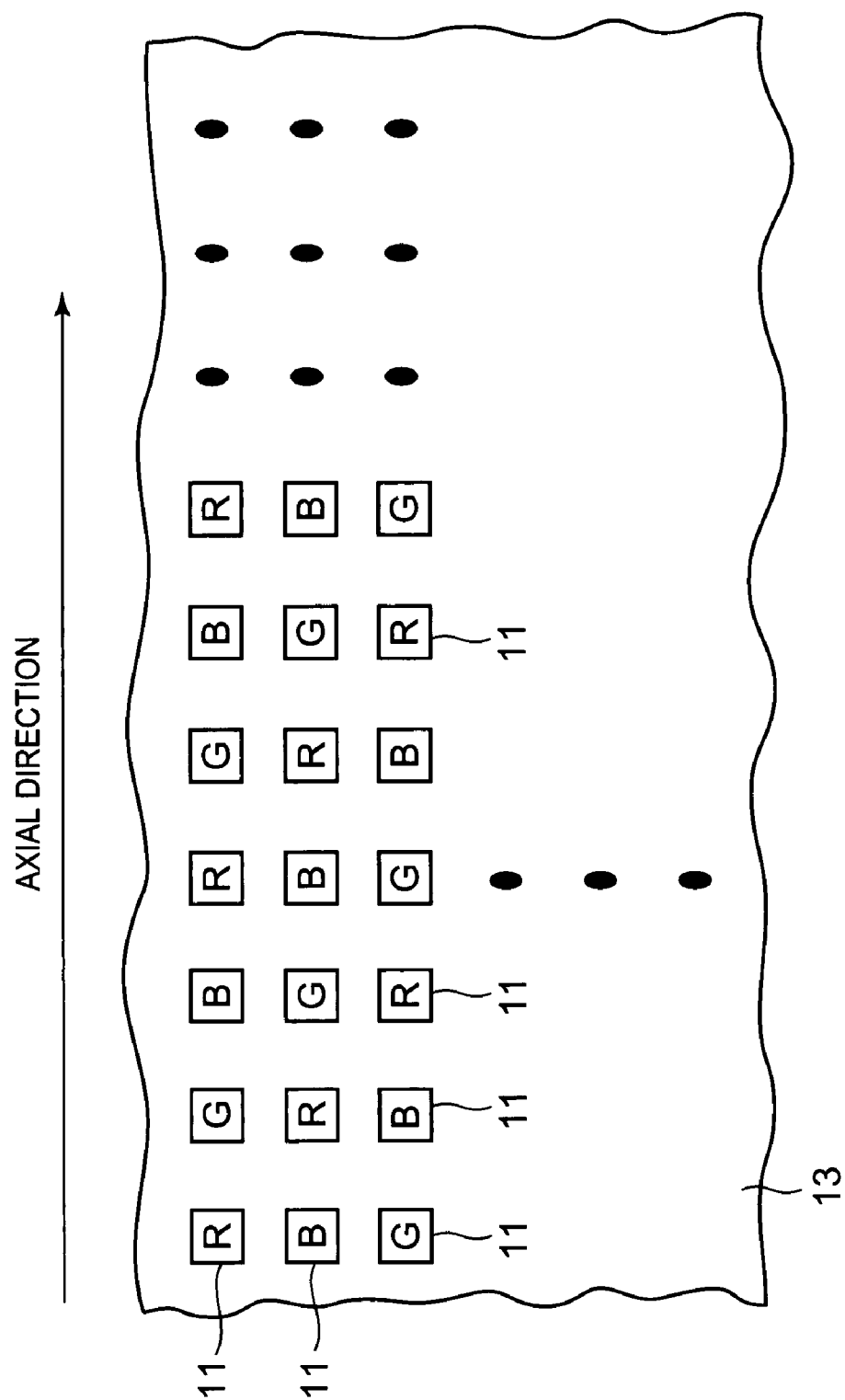
FIG. 5 is a drawing showing exemplarily a fixing state of light emitting elements in the light source unit according to the invention.

Furthermore, when the plurality of light emitting diodes are mounted on the light source substrate 13, red light emitting diodes, green light emitting diodes, and blue light emitting diodes are used as the light emitting elements 11. As is shown in FIG. 5, when aligning light emitting diodes in rows and columns, a red light emitting diodes, a green light emitting diodes and a blue light emitting diode are disposed in such a manner as to be aligned sequentially in a row so that light emitting diodes of the same color are not aligned adjacent to each other, and when disposing red, green and blue light emitting diodes in a column, the light emitting diodes are aligned sequentially in a column so that light emitting diodes of the same color are not aligned adjacent to each other, whereby the generation of a color shading is prevented.

When the light source substrate 13 is fixed to the main body portion 20, the light source substrate 13 is mounted in a position which is spaced away from the projecting port 21, so that among light rays which are emitted from the light emitting elements 11, angles of light rays which are projected from the projecting port 21 without being reflected on the wall surfaces at which the light rays intersect the optical axis 22 are made small.

Namely, in the top wall 23 and the bottom wall 24 of the main body portion 20 which define the longer member side reflecting planes which are planes defining the longer member sides of the projecting port 21, since the bottom member of the isosceles triangle is longer than the bottom member of the trapezoid, a space between both side members of the top wall 23 and the bottom wall 24 are kept wide until the side members come closer to each other in the vicinity of an apex of the triangle, and this facilitates the mounting of the light source substrate 13 in the position which is spaced away from the projecting port 21.

In addition, since the right side wall 25 and the left side wall 26 which define the shorter member side reflecting surfaces which are planes defining the shorter member sides of the projecting port 21 are each formed into the isosceles trapezoid, the right side wall 25 and the left side wall 26 each have a top member in an opposite direction to the projecting port 21, and a space between the side members is kept wide even on the rear end side of the light source unit 40, this facilitating the mounting of the light source substrate 13 in the position which is spaced away from the projecting port 21.

Due to this configuration, the angles at which the light rays emitted from the light emitting elements 11 and projected from the projecting port 21 without being reflected on the wall surfaces which constitute the reflecting planes intersect the optical axis 22 can be made small, and among the light rays which intersect the optical axis 22 at large angles when they are emitted from the light emitting elements 11, as to the light rays emitted from the light emitting elements 11 on the right side wall 25 or the left side wall 26 which constitute the shorter member side walls, the angles at which they intersect the optical axis 22 can be made smaller by 2β each time the light rays are reflected on the left side wall 26 or the right side wall 25, whereas as to the light rays emitted from the light emitting elements 11 on the top wall 23 or the bottom wall 24 which constitute the longer member side wall surfaces, the angles at which they intersect the optical axis 22 can be made smaller by 2α each time the light rays are reflected on the bottom wall 24 or the top wall 23.

Then, the number of times the light ray which first intersects the optical axis 22 at a large angle is reflected on the reflecting planes can be increased by spacing the light source substrate 13 away from the projecting port 21, thereby making it possible to facilitate the reduction of diffusion angle of light projected from the projecting port 21.

Figure 6:
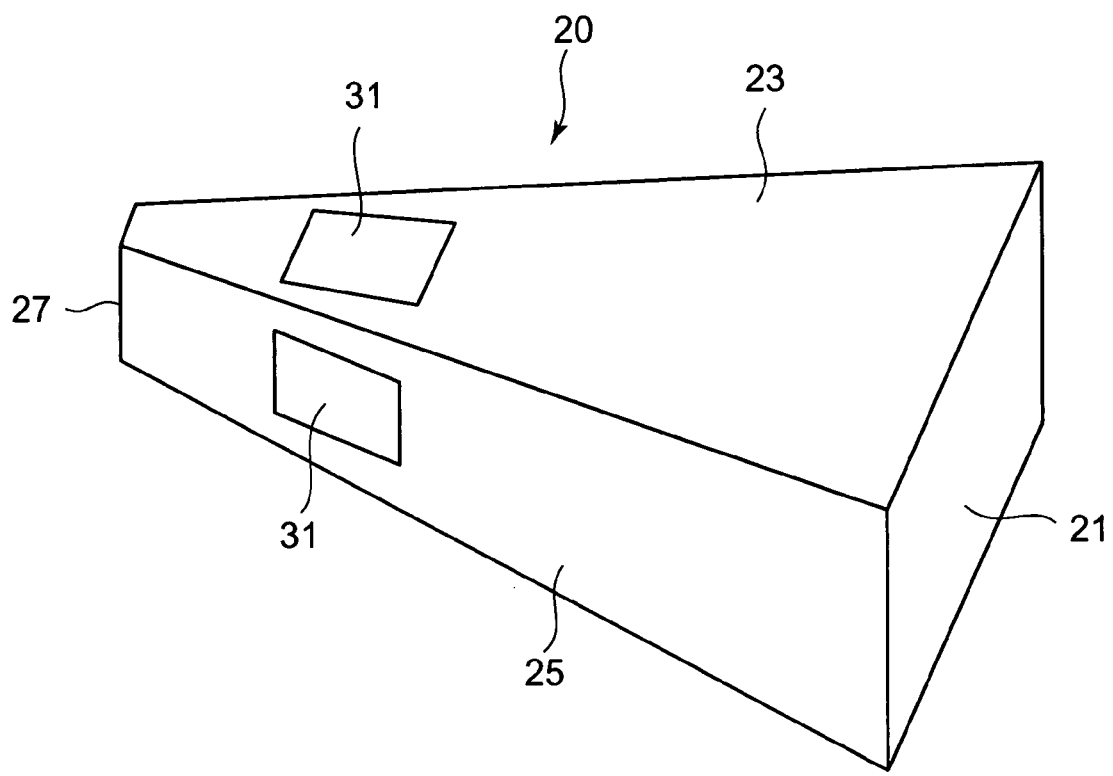
FIG. 6 is a perspective view of a light source unit of another embodiment according to the invention.

In addition, the configuration of the main body portion 20 is not limited to a configuration in which a rear end which oppositely faces the projecting port 21 is made into the straight-line edged portion 29 as shown in FIGS. 1 and 3, and hence, the main body portion 20 may be configured such that as shown in a second embodiment depicted in FIG. 6, a rear end face 27 may be formed at the rear end of the main body portion 20 in such a manner as to be parallel to the projecting port 21.

In a second embodiment, by making a rear end face 27 of a main body portion 20 into a reflecting plane as well, light traveling to the rear of the main body portion 20 in the interior thereof can be reflected on the rear end face 27 so as to travel forwards to thereby projected out from the projecting port 21, and the length of the main body portion 20 in its axial direction 22 can be reduced so that a light source unit 40 can be made smaller in size.

Then, a mirror coating is applied to the surfaces of the main body portion 20 on which the plurality of light emitting elements 11 are mounted except for the projecting port 21 and the light source mounting portions 31 where the light source substrates 13 are mounted, so as to ensure that light within the wall surfaces is reflected on the wall surfaces.

Figure 7:
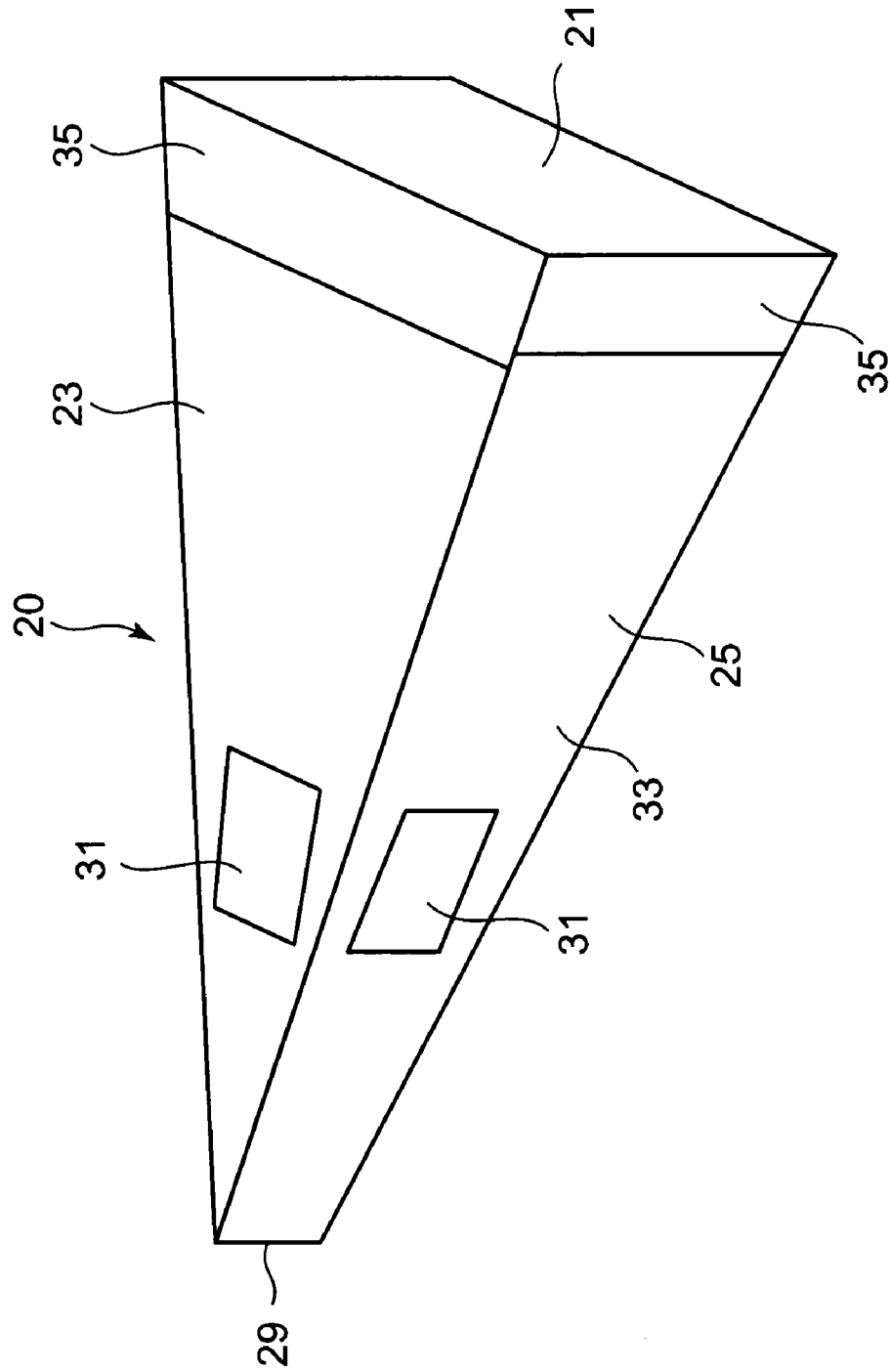
FIG. 7 is a perspective view of a light source unit of a further embodiment according to the invention.

When mirror coating applied portions 33 to which a mirror coating is applied are formed on the top wall 23 and the bottom wall 24, and the right side wall 25 and the left side wall 26 which all constitute the wall surfaces of the main body portion 20, in the event that light inside the main body portion 20 is totally reflected in the vicinity of the projecting port 21, as is shown in FIG. 7, no mirror coating is applied to such total reflection areas 35 on the wall surfaces.

Figure 8:
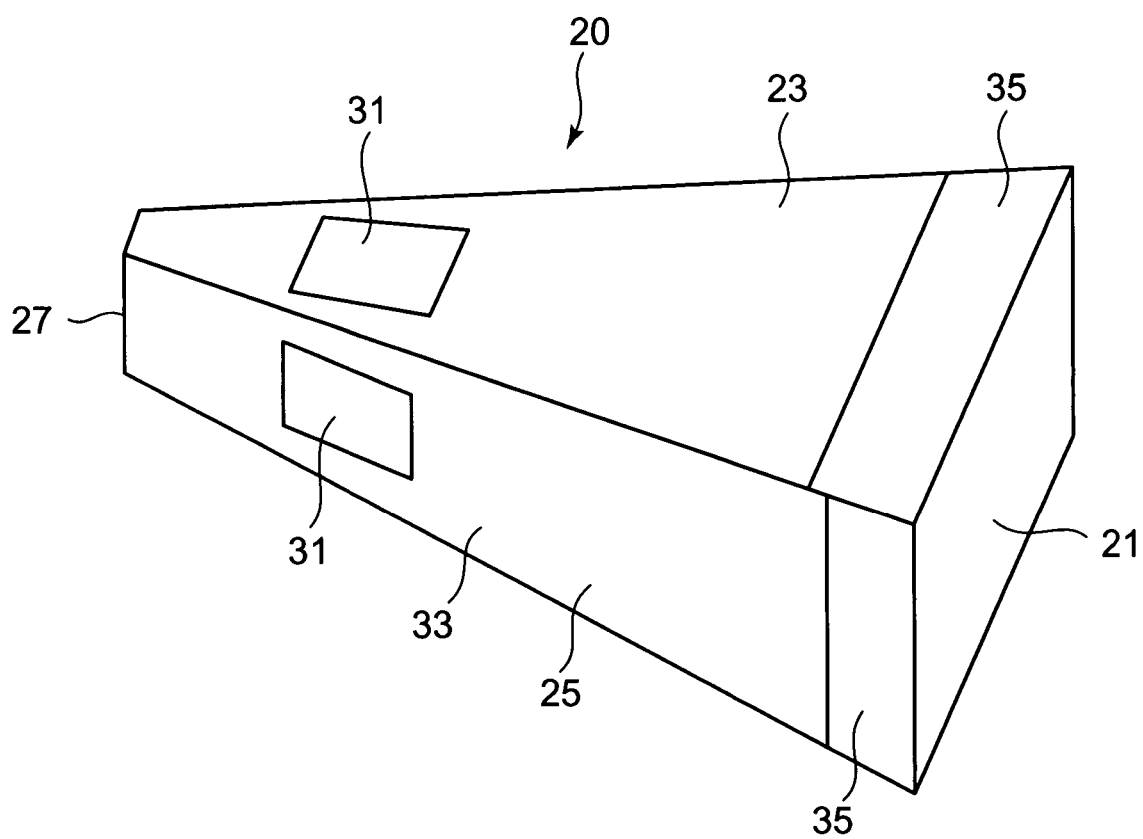
FIG. 8 is a perspective view of a light source unit of a further embodiment according to the invention.

In addition, in the main body portion 20 in which the rear end face 27 is provided at the rear end of the main body portion 20, in the event that as is shown in FIG. 8, light is totally reflected in the vicinity of the projecting port 21, no mirror coating is applied to such total reflection areas 35, and in the event that an angle at which light traveling to the rear from the light emitting element 11 intersects the optical axis 22 is increased, whereby the light is then totally reflected on the rear end face 27, no mirror coating is applied to the rear end face 27 as well as the total reflection area 35 on the wall surfaces, so that the mirror coating is not applied more than really required.

The main body portion 20 is not limited to the solid optical glass but may be formed into a hollow mirror tunnel which is defined by isosceles triangular and isosceles trapezoidal plain mirrors, so that light inside the mirror tunnel is projected from a projecting port 21 which is now a rectangular opening while being reflected on those plane mirrors.

Figure 9:
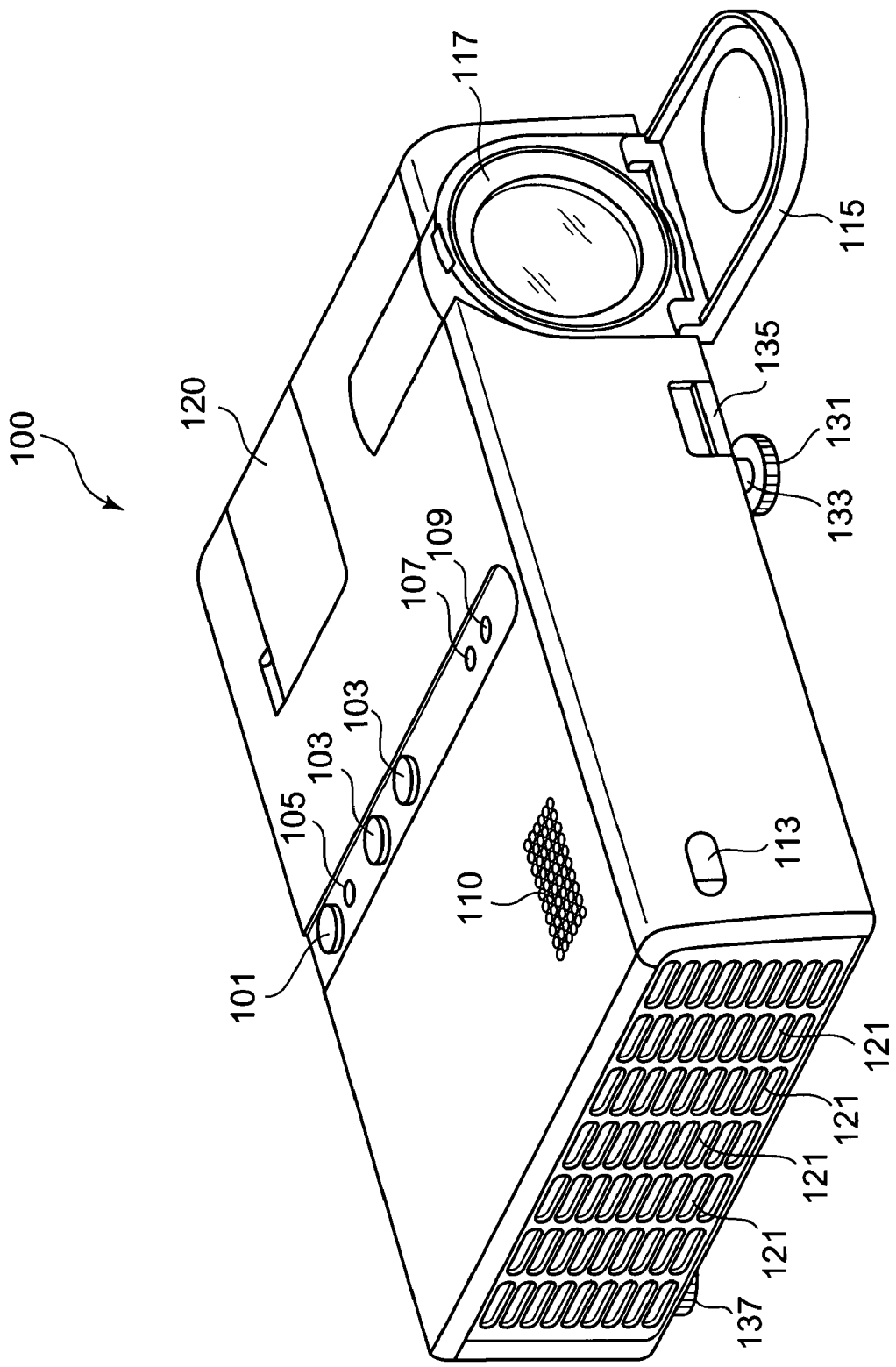
FIG. 9 is a perspective view of a projector of an embodiment according to the invention which shows an external view thereof.

Furthermore, the projector 100 which incorporates therein the light source unit 40 like this is, as shown in FIG. 9, formed substantially into a rectangular parallelepiped, and provided on a top panel thereof are an indicator lamp 109 and a heating indicator 107, a power supply key 101 and a stand-by indicator 105 which is illuminated when the power supply key 101 or power supply is switched on, an image quality adjusting key 103 for performing an automatic image quality adjustment and a manual image quality adjustment and a speaker opening 110. Furthermore, a key box cover is also provided on the upper panel which incorporates therein various types of adjustment keys.

In addition, a projecting port 117 is provided in a front panel of the projector 100 to lie inside a lens cover 115 which is made to be opened and closed, and a remote control receiving section 113 for receiving an infrared signal from a remote controller for remotely controlling the projector 100 is also formed on the front panel, and exhaust fans 25 are incorporated at a side portion of the projector 100 with exhaust ports 121 formed in a side panel thereof.

Additionally, rear legs 137 are provided in the vicinity of longitudinal ends on a rear side of a bottom panel of the projector 100, and a front leg 131 is provided at the center on a front side of the bottom panel for adjusting the height of a body of the projector 100 by means of a rod. Furthermore, a lock key 135 for fixing the front leg 131 to a certain height is also provided on the front panel.

Figure 10:
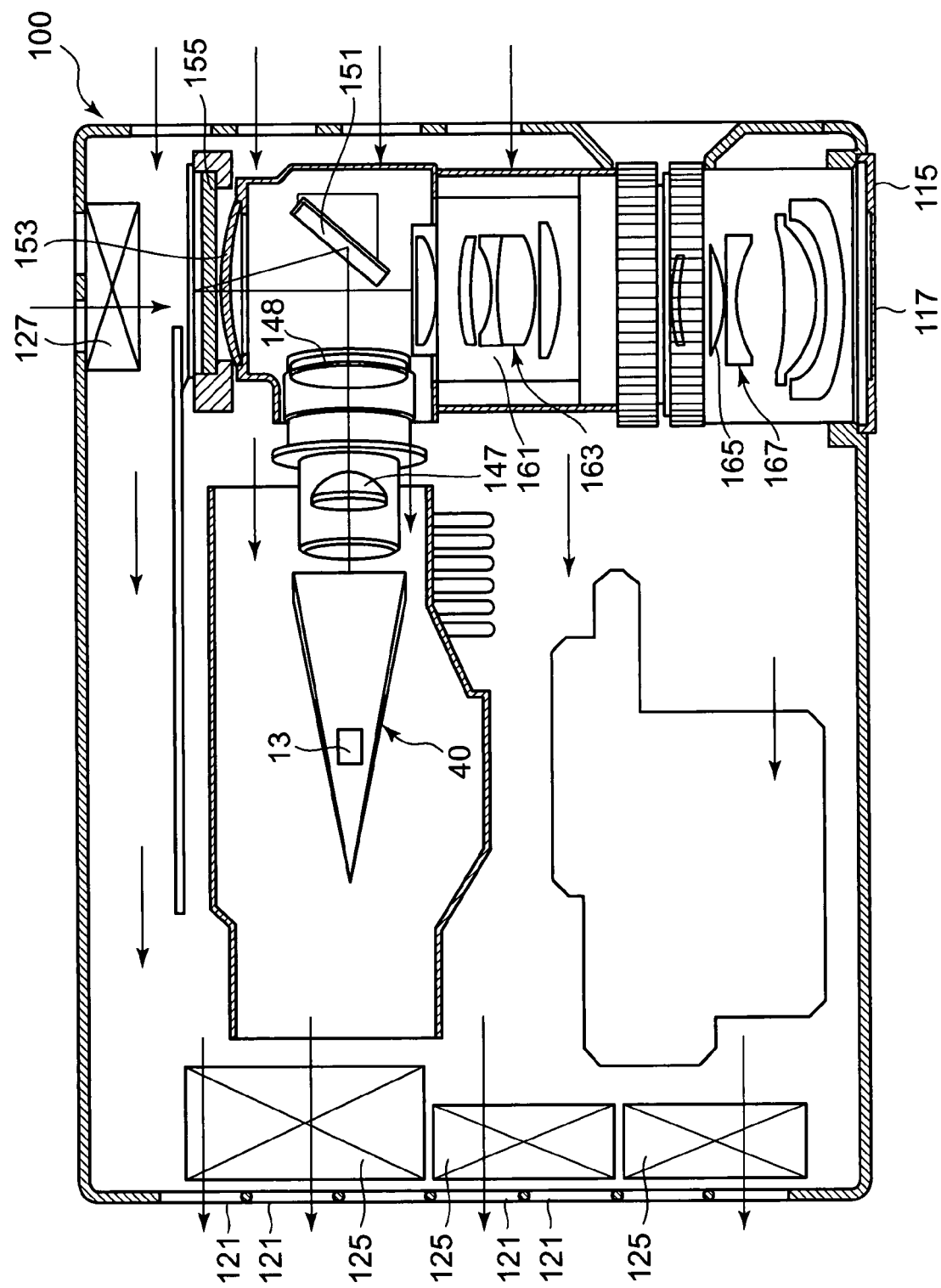
FIG. 10 is a drawing showing schematically an internal configuration of the projector of the embodiment according to the invention.

Thus, the light source unit 40 is incorporated in the interior of the projector 100, and as is shown in FIG. 10, the optical axis 22 of the light source unit 40 in which the light source substrates 13 are mounted on the main body portion 20 is disposed in such a manner as to match optical axes of the light source side lens elements 147, 148, whereby the optical axes of the group of light source side lens elements and the optical axis 22 of the light source unit 40 are made to coincide with each other.

Furthermore, the mirror 151 of the light source side optical system is disposed in such a manner as to be oblique at a predetermined angle relative to an optical axis of emerging light from the light source unit 40, so as to reflect light that is caused to emerge from the light source unit 40 and passes through the light source side lens elements 147, 148 towards the display element 155, so that light reflected by the mirror 151 is projected on to the display element 155 from a direction which is inclined towards one direction relative to a forward direction of the display element 155.

On the other hand, a glass cover for protecting the display element 155 is disposed in front of the display element 155, and furthermore, a relay lens 153 is disposed which functions not only to correct light projected from the direction which is inclined to the one side relative to the forward direction of the display element 155 into parallel light which follows a direction which is inclined at a predetermined angle relative to the forward direction of the display element 155 so as to be incident on the display element 155 but also to collect image light rays that have emerged from the display element 155 so as to be incident on the projection system lens component.

The display element 155 is a display element 155 which is not provided with a coloring device such as a color filter for coloring incident light, and in this embodiment, a micromirror display element 155 which is briefly referred to as a so-called DMD (Digital Micromirror Device) is used.

This micromirror display element 155 is such as to reflect incident light that has entered at an incident angle within a predetermined angle range based on the incident direction which is inclined towards the one direction relative to the forward direction of the micromirror display element 155 in the forward direction and an oblique direction by switching the tilting directions of a plurality of micromirrors. Light rays incident on the micromirrors which are tilted in one tilting direction are reflected in the forward direction by the micromirrors so tilted, while light rays incident on the micromirrors which are tilted in the other tilting direction are reflected in the oblique direction by the micromirrors so tilted, so that an image is displayed by virtue of a bright display resulting from the reflection of light rays towards the forward direction and a dark display resulting from the reflection of light rays towards the oblique direction.

The brightness of the bright display can be changed arbitrarily by controlling the length of time during which the micromirrors are kept tilted to the one tilting direction (the tilting direction in which the incident light rays are reflected towards the forward direction), and therefore, an image which is imparted a gradation in brightness can be displayed by this micromirror display element 155.

In addition, a microcomputer is provided in the projector of this embodiment as a projector control unit, and operations of circuits inside the projector are controlled by this projector control unit in such a manner that when the power supply switch is switched on, the light source unit 40 is illuminated, and the cooling fans such as the exhaust fans 125 are driven at a rated speed which matches the output of the light source unit 40 and the fan configuration and arrangement of the cooling fans, so that outside air is taken into the interior of the projector from intake ports provided in a side of the projector housing, while inside air in the interior of the projector is exhausted from the exhaust ports 121, the projector 100 being thereby put into a stand-by state.

In addition, the projection system lens component includes an incident side fixed lens barrel 161 and an emerging side movable lens barrel 165 which is brought into engagement with the fixed lens barrel 161 and is configured to be moved back and forth axially when operated rotationally and constitutes a varifocal lens made up of a fixed lens component 163 in which a plurality of lens elements are provided in combination in the fixed lens barrel 161 and a movable lens component 167 in which a plurality of lens elements are provided in combination in the movable lens barrel 165.

Furthermore, a plurality of intake holes which are each formed into the shape of an elongated hole are provided in the bottom surface of the projector housing, a side surface of the projector housing where the projection system lens component is disposed and a rear surface of the projector housing, respectively, for cooling the interior of the projector housing.

This projector 100 is such that light is emitted from the light source unit 40, so that the light that has emerged from the projector 100 is projected towards the micromirror display element 155 by means of the light source side lens elements 147, 148 and the mirror 151.

Then, in the projector 100, single-color image data of red, green and blue is sequentially written on the micromirror display element 155 in synchronism with projection cycles of red, green and blue light, whereby single-color images of red, green and blue are caused to be displayed sequentially, and then single-color image light rays of red, green and blue which are caused to emerge sequentially from the micromirror display element 155 are enlarged by the projection system lens component so as to be projected on to a projection screen. Thus, according to the projector 100, the single-color images of red, green and blue are superposed one on another to display a full-color image on the projection screen.

Additionally, a posture adjustment of the projector housing to match the projecting direction of the images by the projection system lens component with the projection screen can be implemented by adjusting the projecting height of the front leg 131 in a white color state in which red, green and blue light rays are projected by the projection system lens component without inputting image data into the display element 155 or a full-color image projecting state in which image data is inputted into the display element 155.

After the projection of images is completed, the following operations only have to be performed; the input of image signals or video signals is stopped, the power supply key 101 is switched off, and the projection lens cover 115 is closed. When the power supply key 101 is switched off, the light emitting element 40 of the light source unit 40 is turned off, and after a certain period of time has elapsed, the driving of an outside air intake fan 127 and the exhaust fans 125 is stopped.

Note that while the red light emitting diodes, the green light emitting diodes and the blue light emitting diodes are used as the light source emitting elements, the invention is not limited thereto, and hence, the light emitting element 40 of the light source unit 40 may utilize light emitting diodes of complementary colors such as cyan, magenta and yellow.

In addition, there may occur a case where a white light emitting diode or a plurality of light emitting diodes of different colors are used to produce white light, and in the event that white light is emitted from the light source unit 40, it will be enough if a color wheel is used to convert white light so emitted into red, green and blue light.

While in the configuration shown in FIG. 10, the single light source unit 40 is used, the invention is not limited thereto, and hence, a plurality of light source unit 40 may be used altogether, in which case optical axes 22 of lights emitted from the respective light source units 40 may be converged together by the use of a prism or the like so as to be incident on the light source side lens elements 147, 148 which make up the light source side lens component.

In addition, in place of using red light emitting diodes, green light emitting diodes and blue light emitting diodes as light emitting diodes which are mounted on the respective light source units 40, there may occur a case where light source substrates 13 which are made up of red light emitting diodes only, light source substrates 13 which are made up of green light emitting diodes only and light source substrates 13 which are made up of blue light emitting diodes only are mounted on the light source units 40, respectively.

Figure 11:
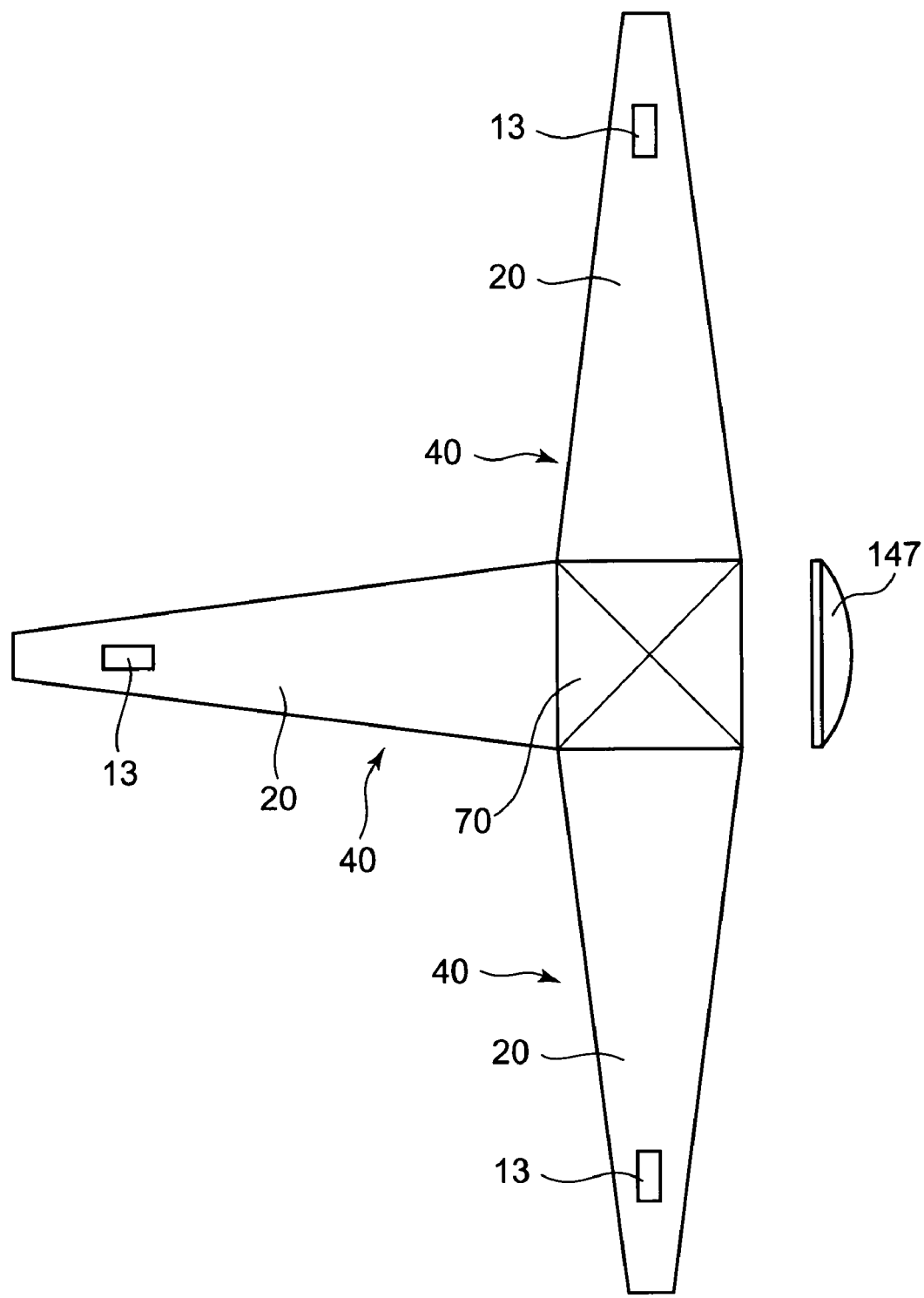
FIG. 11 is a drawing showing another utilization mode of the light source unit in the projector according to the invention.

The three light source units 40 on which the light source substrates 13 in which only the single-color light emitting diodes are arranged to produce light of the single color are mounted in such a manner, as shown in FIG. 11, the three light source units 40 are disposed equidistant from a dichroic prism 70 in three directions which are dispersed radially about the dichroic prism 70 at intervals of 90 degrees.

Also in the event that the optical axes of light from the three light source units 40 are converged together in such a manner as to be superposed one on another by the dichroic prism 70 so that the converged emerging light is incident on the display element 155, in addition to a case where red light, green light and blue light are emitted by switching sequentially the illumination of the respective light source units 40, a configuration can be adopted in which the three light source units 40 are illuminated together continuously, and a color wheel is used to convert sequentially emerging light rays from the light source units 40 into light rays of three colors of red, green and blue, and the light rays so converted are then projected towards the front surface of the display element 155.

Thus, in the projector of the embodiment, by utilizing the light source unit 40 that has been described heretofore, the light source unit 40 can be miniaturized, and the luminance thereof can be increased, and hence, the projector main body can easily be miniaturized and the luminance thereof can easily be increased. In addition, since the light emitting diodes are used, the reduction in temperature inside the housing can also be realized.

In addition, the invention is not limited to the embodiments that have been described heretofore, and hence, the invention can be changed, modified or improved variously without departing from the spirit and scope of the invention. Furthermore, the light source unit of the invention can be applied not only to projectors but also to other electric appliances and illuminating appliances.

What is claimed is:

1. A light source unit having a main body portion and light emitting elements, wherein:
   the main body portion comprises wall surfaces which constitute reflecting planes and which are inclined so as to define a rectangular projecting port;
   an inclination angle of the wall surfaces disposed on longer member sides of the projecting port is smaller than an inclination angle of the wall surfaces disposed on shorter member sides of the projecting port;
   the wall surfaces disposed on the shorter member sides each have a trapezoidal shape; and
   the light emitting elements are disposed at all respective wall surfaces on both the longer member sides and the shorter member sides at substantially a same distance from the projecting port.

2. A light source unit as set forth in claim 1, wherein a rear end of the main body portion has a straight-line-like shape and is parallel to a direction of the shorter member sides of the projecting port.

3. A light source unit as set forth in claim 1, wherein a rear end of the main body portion comprises a rectangular rear end face which is smaller than the projecting port, and
   wherein a direction of a longer member side of the rear end face is parallel to a direction of the shorter member side of the projecting port.

4. A light source unit as set forth in claim 1, wherein the main body portion comprises a hollow mirror tunnel.

5. A light source unit as set forth in claim 1, wherein the main body portion comprises a solid tapering rod.

6. A light source unit as set forth in claim 5, wherein a mirror coating is applied to the wall surfaces of the main body portion.

7. A light source unit as set forth in claim 1, wherein the light emitting elements comprise red light emitting diodes, green light emitting diodes, and blue light emitting diodes.

8. A light source unit as set forth in claim 7, wherein the red light emitting diodes, the green light emitting diodes, and the blue light emitting diodes are disposed in rows and columns in such a manner that light emitting diodes of a same color are not disposed adjacent to each other in both a direction which is parallel to the projecting port and in a direction which intersects the projecting port.

9. A projector comprising:
   a light source unit;
   a light source side optical system;

a display element which generates an image to be projected;

a projection side optical system which projects the image to be projected; and a projector control unit;

wherein:

the light source unit comprises a main body portion and light emitting elements;

the main body portion comprises wall surfaces which constitute reflecting planes and which are inclined so as to define a rectangular projecting port;

an inclination angle of the wall surfaces disposed on longer member sides of the projecting port is smaller than an inclination angle of the wall surfaces disposed on shorter member sides of the projecting port;

the wall surfaces disposed on the shorter member sides each have a trapezoidal shape; and the light emitting elements are disposed at all respective wall surfaces on both the longer member sides and the shorter member sides at substantially a same distance from the projecting port.

10. A projector as set forth in claim 9, wherein a rear end of the main body portion of the light source unit has a straight-line-like shape and is parallel to a direction of the shorter member sides of the projecting port.

11. A projector as set forth in claim 9, wherein a rear end of the main body portion of the light source unit comprises a rectangular rear end face which is smaller than the projecting port, and wherein a direction of a longer member of the rear end face is parallel to a direction of the shorter member side of the projecting port.

12. A projector as set forth in claim 9, wherein the main body portion of the light source unit comprises a hollow mirror tunnel.

13. A projector as set forth in claim 9, wherein the main body portion of the light source unit comprises a solid tapering rod.

14. A projector as set forth in claim 13, wherein a mirror coating is applied to the wall surfaces of the main body portion of the light source unit.

15. A projector as set forth in claim 9, wherein the light emitting elements of the light source unit comprise red light emitting diodes, green light emitting diodes, and blue light emitting diodes.

16. A projector as set forth in claim 15, wherein the red light emitting diodes, the green light emitting diodes, and the blue light emitting diodes are disposed in rows and columns in such a manner that light emitting diodes of a same color are not disposed adjacent to each other both in a direction which is parallel to the projecting port and in a direction which intersects the projecting port of the light source unit.

17. A projector as set forth in claim 9, wherein a plurality of the light source units are provided, and wherein optical axes of light emitted, respectively, from the plurality of the light source units are made to coincide with each other by a prism so as to be incident on the light source side optical system.

18. A projector as set forth in claim 9, further comprising a dichroic prism which converges light from three directions to light oriented in one direction by superposing the light one on another, wherein the projector incorporates three light source units including a light source unit which utilizes only red light emitting diodes, a light source unit which utilizes only green light emitting diodes, and a light source unit which utilizes only blue light emitting diodes, and wherein the three light source units are disposed in three directions dispersed about the dichroic prism, respectively.

* * * * *